Jan. 31, 1950  F. W. WHITLOCK ET AL  2,495,797
ELECTRICAL BORE GAUGE

Filed March 27, 1947  2 Sheets-Sheet 1

Fig-2-

TO VOLTAGE SUPPLY

Inventors
Fred W. Whitlock
William E. Summerbell

By G. J. Kessenich, J. H. Church & W. E. Thibodeau
Attorneys

Jan. 31, 1950 F. W. WHITLOCK ET AL 2,495,797
ELECTRICAL BORE GAUGE
Filed March 27, 1947 2 Sheets-Sheet 2
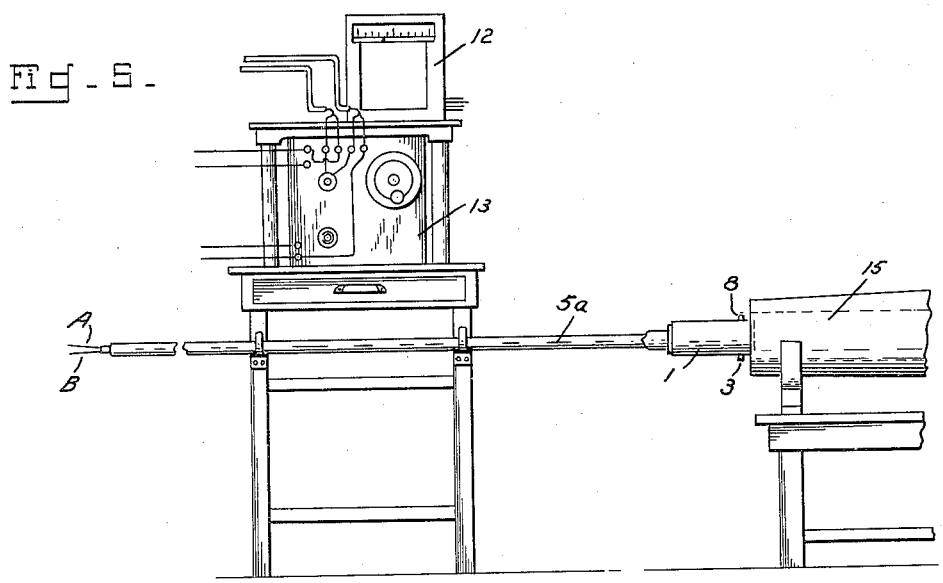
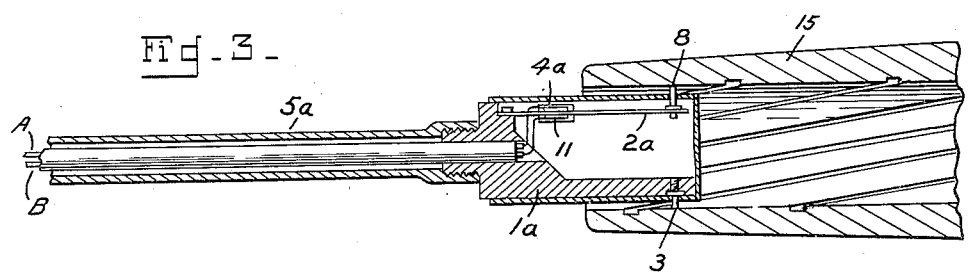
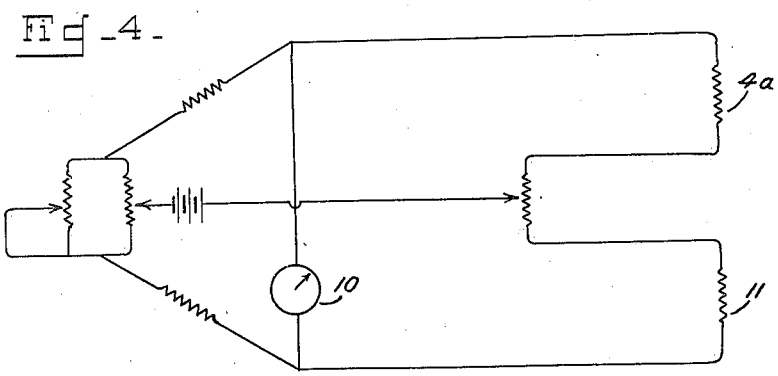
Inventors
Fred W. Whitlock
William E. Summerbell
By G. J. Kesserich, J. H. Church + H. E. Thibodeau
Attorneys Patented Jan. 31, 1950

2,495,797

UNITED STATES PATENT OFFICE 2,495,797

ELECTRICAL BORE GAUGE

Fred W. Whitlock, Rockford, Ill., and William E. Summerbell, Washington, D. C.

Application March 27, 1947, Serial No. 737,682

4 Claims. (Cl. 33—178)

(Granted under the act of March 3, 1883, as amended April 30, 1928; 370 O. G. 757)

The invention described herein may be manufactured and used by or for the Government for governmental purposes without the payment of any royalty thereon.

This invention relates to an electric dimension gage and particularly to an internal tube caliper.

Among the objects of our invention are to provide an electric dimension gage which combines inherent sensitivity and accuracy, provides ease of operation, and is characterized by simplicity of manufacture.

Another object is to permit the use of direct current in an electric dimension gage without need of alternating current instruments or circuits, and to permit the use of inexpensive electrical components.

Still another object is to provide a device of rugged and durable construction with substantially no relative movement of parts to cause wear.

The above objects are attained by use of a strain gage on a cantilever arm near the point where the arm experiences its maximum bending moment. Variations in the distance between the free end of the cantilever arm and a point immovable with respect to the fixed end of the arm cause the cantilever arm to deflect, placing the strain gage under stress, which causes the electrical resistance of the gage to vary; this variation in resistance can be measured by any suitable known means such as a Wheatstone bridge. While the drawings and description show the invention applied to a gage for measuring the internal diameter of casings, tubes, etc., it will be obvious that by suitable alterations in the design of the gage housing and elements, the invention can be made applicable to measuring external diameters of cylinders, and in fact to the measurement of small differences in relative distance between any points on the surfaces of mechanical elements.

In the accompanying drawings,

Figure 2 is a wiring diagram of a bridge circuit which may be used with the embodiment of Figure 1;

Figure 3 is a longitudinal cross section of a construction employing two strain gages;

Figure 4 is a diagram of a bridge circuit for the embodiment of Figure 3;

Figure 5 is a diagrammatic view showing a complete apparatus for internal calipering of a gun barrel.

Figure 1:
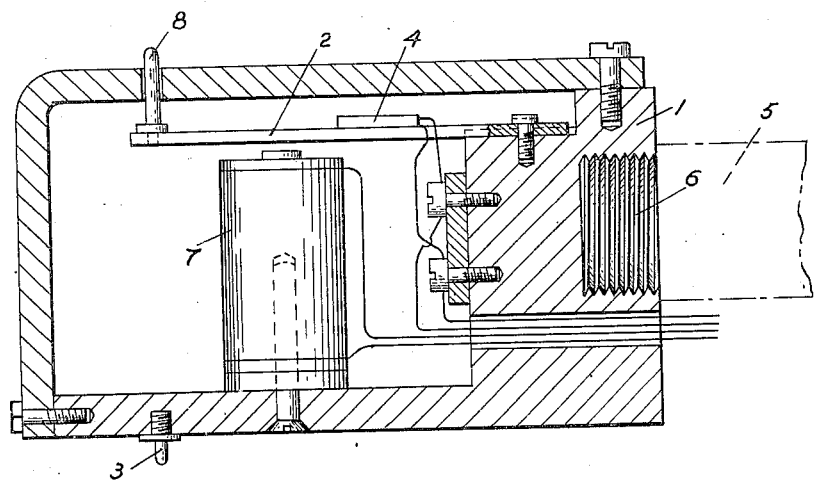
Figure 1 is a longitudinal cross section of one embodiment of the invention.
Figure 1:
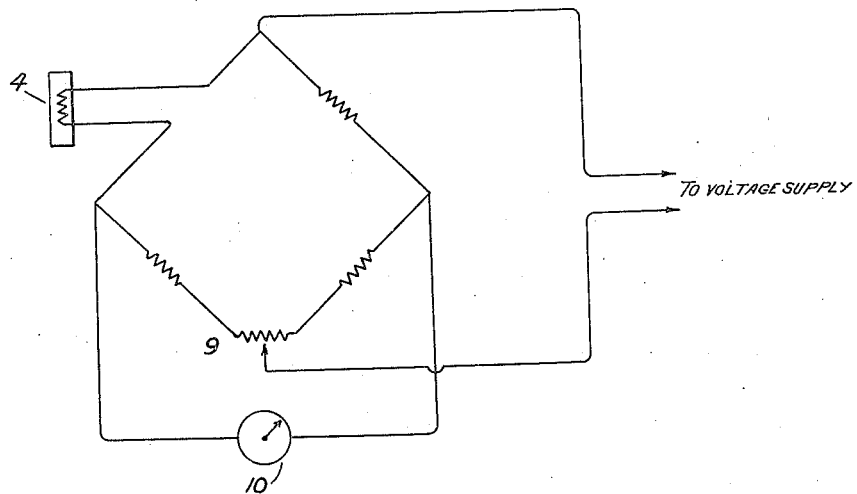

Referring to Figures 1 and 2, frame 1 supports the essential components of the calipering device, including calipering points 3 and 8. This frame is provided with threaded means 6 for the attachment of a rod, whereby the device may be inserted into a long tube, such as a gun barrel. A spring deflection cantilever arm 2 carries movable calipering point 8 and strain gage 4, whose electrical resistance varies as the cantilever arm is flexed. Calipering point 3 is fixed to frame 1. The strain gage 4 may be of a commercially available type such as the "SR-4 strain gage" available from Baldwin Southwark Division, The Baldwin Locomotive Works, Philadelphia, Pa.

For some applications an electro-magnet 7 is used to retract the movable point 8 by means of a conventional switching arrangement whereby the electro-magnet may be energized from a suitable source (not shown) which may be the same source which is used in the measuring circuit. The magnet is necessary in the case where internal gun barrel diameters are checked. In moving the metering head assembly, as shown, in Figure 4 along the bore, the rifling must be crossed. By energizing the magnet, point 8 may be withdrawn from contact with the gun barrel, permitting the lands to be passed without straining the device. This feature is of course equally useful in traversing any irregularity without forcing the device.

Figure 2 shows a conventional Wheatstone bridge circuit for measuring the variations in resistance of strain gage 4, which is shown electrically inserted in one arm of the bridge. Potentiometer 9 is adjusted to balance the bridge. The condition of balance is shown by meter 10. The setting required to balance the bridge is a function of the strain on the element 4 and is therefore a measure of the position of the movable point 8 relative to fixed point 3.

Figure 3 shows an improved design of the electric gage wherein a strain gage 11 is mounted on the opposite side of the cantilever arm 2 from another strain gage 4a corresponding to gage 4 in Figure 1. Thus gage 4a is stressed in tension and gage 11 in compression as the cantilever arm 2a moves inwardly. By inserting the two strain gages in two arms of a Wheatstone bridge as shown in Figure 6, greater sensitivity may be obtained than with a single strain gage. Hollow rod 5a is threaded to frame 1a and carries leads A and B from the strain gages.

Figure 4 shows a Wheatstone bridge circuit which may be used with the embodiment of Figure 3, the two gages 4a and 11 constituting two arms of the bridge, as shown.

An automatic recording and balancing potentiometer may be used to provide a continuous graphic record as the caliper head is moved along a gun barrel or surface of a machine. Such potentiometers are commercially available and do not constitute a part of our invention. Such an automatic recording and balancing potentiometer is shown in Figure 5 at 12.

Figure 5 shows one embodiment of the complete measuring apparatus as actually employed. The Wheatstone bridge is housed in casing 13 and is connected to leads A and B from the strain gages. Recording and rebalancing potentiometer 12 provides a permanent record of the variations in internal diameter of the bore of gun 15 as caliper points 3 and 8 move along the gun barrel.

We claim:

1. Measuring apparatus comprising a measuring head, a fixed measuring point on said head, a cantilever arm supported by said head, a second measuring point mounted on said cantilever arm and movable relative to said fixed point by flexing said arm, electrical resistance means sensitive to straining of the cantilever arm due to motion of said moving point relative to said fixed point, and means for indicating the value of said resistance means, said electrical resistance means including at least one resistance strain gage mounted on a surface of the cantilever arm near the region where said arm experiences its maximum bending moment, the length of said gage being small relative to the length of the cantilever arm.

2. Tube calipering apparatus comprising a measuring head having caliper fingers mounted thereon and adapted for insertion into a tube to be calipered, one of said fingers being mounted to move independently of any other finger in response to variations in bore dimensions of a tube to be calipered, said independently movable finger being mounted on a cantilever arm, said cantilever arm being supported by said head, electrical resistance means mounted on said cantilever arm near the point where said arm experiences its maximum bending moment, said electrical resistance means being so mounted as to be sensitive to straining of the cantilever arm so that its resistance value varies in accordance with the strain on the arm, and remote controlled means for withdrawing said independently movable finger from contact with the tube surface to be calipered.

3. Tube calipering apparatus comprising a measuring head having caliper fingers mounted thereon and adapted for insertion into a tube to be calipered, one of said fingers being mounted to move independently of any other finger in response to variations in bore dimensions of a tube to be calipered, a cantilever arm supported by said head, said independently movable finger being mounted on said cantilever arm, electrical resistance means mounted on said cantilever arm near the point where said arm experiences its maximum bending moment, said electrical resistance means being so mounted as to be sensitive to straining of the cantilever arm so that its resistance value varies in accordance with the strain on the arm, and electro-magnetic means for withdrawing said independently movable finger from contact with the tube surface to be calipered.

4. Tube calipering apparatus comprising a measuring head having caliper fingers mounted thereon and adapted for insertion into a tube to be calipered, one of said fingers being mounted to move independently of any other finger in response to variations in bore dimensions of a tube to be calipered, a cantilever arm mounted on said head, said independently movable finger being mounted on said cantilever arm, electrical resistance means mounted on said cantilever arm near the point where said arm experiences its maximum bending moment, said electrical resistance means being so mounted as to be sensitive to straining of the cantilever arm so that its resistance value varies in accordance with the strain on the arm, and an electro-magnet mounted in said measuring head so as to act directly upon said cantilever arm to withdraw said independently movable calipering finger from contact with the tube surface to be calipered.

FRED W. WHITLOCK.
WILLIAM E. SUMMERBELL.

REFERENCES CITED

The following references are of record in the file of this patent:

UNITED STATES PATENTS

| Number    | Name         | Date          |
|-----------|--------------|---------------|
| 2,122,664 | Terry        | July 5, 1938  |
| 2,239,811 | Cuppers      | Apr. 29, 1941 |
| 2,239,981 | Terry et al. | Apr. 29, 1941 |
| 2,316,975 | Ruge         | Apr. 20, 1943 |
| 2,322,319 | Rugge        | June 22, 1943 |
| 2,325,299 | Bench et al. | July 27, 1943 |
| 2,397,196 | Neff         | Mar. 26, 1946 |